3,548,271
NUCLEAR WELL LOGGING ELECTRONIC CIRCUIT FOR THE SURFACE CONTROL OF A MOTOR LOCATED IN A LOGGING SONDE BY FREQUENCY SELECTIVE MEANS
John G. Kampfer, Houston, Tex., assignor to Texaco Inc., New York, N.Y., a corporation of Delaware
Filed July 29, 1968, Ser. No. 748,241
Int. Cl. H04q 7/02
U.S. Cl. 318—16                             5 Claims

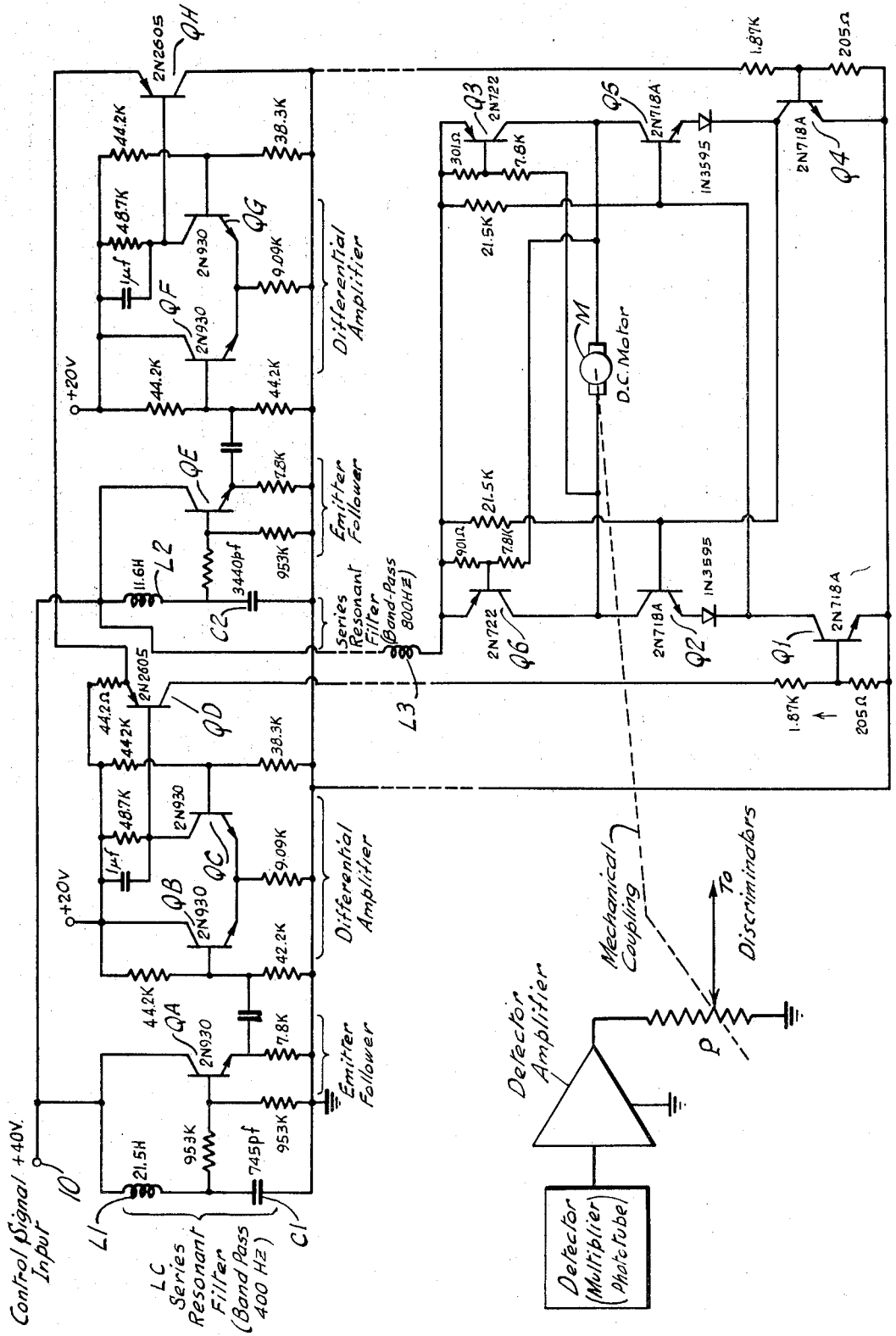

ABSTRACT OF THE DISCLOSURE

Herein disclosed is a logging apparatus including, among other things, a drive motor, motor control circuitry and a potentiometer, driven by the drive motor, for adjusting gain of at least one parameter associated with the logging apparatus. The aforementioned logging apparatus and included elements are located in a sonde deep in an earth borehole. The sonde including the aforesaid elements is suspended in the borehole at the end of a logging cable which extends upwardly through the borehole to the surface of the earth. From the earth's surface appropriate signals are transmitted down the logging cable to the motor control circuitry to control the motor and ultimately reposition a potentiometer wiper arm to change gain as desired.

BACKGROUND OF THE INVENTION

This invention pertains, in general, to systems for controlling well logging apparatus located deep in a borehole in the earth from a point on the surface of the earth; and, more particularly, to a system which permits the surface control of the pulse amplitudes generated by a detector located in an earth borehole in connection with nuclear well logging apparatus such as chlorine logging instruments or the like.

In nuclear well logging, and especially when running a chlorine log, it is desirable to change the amplitude of the information pulses which are generated by a detector in a sonde deep in an earth borehole and it is further desirable to control this amplitude change from the surface of the earth at the end of a long (e.g., 20,000 feet) logging cable which spans the distance in the borehole between a detector therein and control elements located at the surface of the earth.

SUMMARY OF THE INVENTION

One object of the present invention is to control the amplitude of pulses generated by a detector deep within a well borehole from the surface of the earth.

Another object of the invention is to control the energization and rotation direction of a D.C. motor by using a particular signal or control frequency.

Another object of the invention is to achieve the aforementioned control function with simple and reliable means.

Other objects and advantages of the invention, as well as the many features thereof, will become apparent by studying the detailed description, hereinafter set forth, and the accompanying drawing illustrating an embodiment of the invention.

DESCRIPTION OF THE PREFERRED EMBODIMENT

Illustrated in the drawing figure is the control network in accordance with the invention. Interconnecting the surface control circuitry and the circuitry in the borehole is a long logging cable (e.g., 20,000 feet cable) which communicates signal and power pulses between the surface control circuitry and the circuitry located in the logging tool, or sonde, deep in the earth borehole.

As shown the control circuitry includes a coil L1 connected in series with a capacitor C1 and these elements form a L–C series resonant band pass filter. In the illustration shown the L–C band pass filter is tuned to a frequency of 400 Hertz. Coupled in the manner shown in the drawing figure with the band pass filter is a transistor QA which is connected in an emitter follower configuration. The output of the emitter follower transistor QA is capacitively coupled to the input of a differential amplifier which is comprised of the two transistors QB and QC. As shown the collector electrode of transistor QC is directly coupled to the base of another transistor QD.

As shown, the control circuitry also includes an additional series resonant band pass filter comprising the coil L2 and the capacitor C2. This series resonant filter is tuned as a band pass filter at 800 hertz in the illustration shown. Coupled with the filter comprising the coil L2 and capacitor C2 is another transistor QE which, as shown, is connected in an emitter follower configuration. The output of the emitter follower transistor QE is, as shown, capacitively coupled to the input of another differential amplifier comprising the transistors QF and QG. Also, as shown the collector electrode of transistor QG is directly coupled to the base of another transistor QH.

An input terminal 10 is provided for injecting an input control signal to the circuitry shown. This input control terminal 10 is located deep within the borehole at the end of an extremely long (e.g., 20,000 feet) logging cable which runs to the surface of the earth. As shown the input terminal 10 is directly coupled with the two series resonant filters L1–C1 and L2–C2 as well as with the collector electrodes of the transistors QA and QE, respectively.

As shown in the drawing figure a positive source of voltage (+20 volts) is provided and, as illustrated, is coupled to the collector electrode of transistor QB and to the collector electrode of the transistor QF. Suitable grounding is provided, as shown, for the emitter followers, differential amplifiers and the band pass filters.

As shown in the drawing figure the transistors Q1, Q2, Q3, Q4, Q5 and Q6 are associated with a D.C. motor M. As indicated the motor is mechanically coupled to a wiper arm of a 2000 ohm potentiometer P.

In nuclear logging data are accepted from some type of detector. The detectors are usually sodium iodide. cesium iodide or plastic scintillators coupled to a multiplier phototube, or the detector may be a lithium drifted germanium detector. In any case the information received from these detectors are electronic in nature and have a linear relation to the energy of the gamma ray or neutron that caused the electronic pulse. If amplitude discrimination is used in processing the pulses, and the discrimination level is set for a predetermined pulse amplitude, they by varying the amplitude of the pulses out of the detector preamp (see drawing figure) a given energy gamma ray or neutron can be discriminated. The potentiometer P is such a device. The output of the preamp can be attenuated dependent on the position of the wiper arm with respect to the minimum and maximum resistance of the potentiometer P when the wiper arm is varied to a minimum and a maximum. The potentiometer P may be connected to a voltage which adjusts the trip point of a Schmitt trigger and thus varies the discrimination level.

Operationally the control circuitry shown in the drawing figure functions as follows:

The control signal employed is a signal having a sine wave shape with a frequency of 400 Hertz (800 Hertz on the L2–C1 filter) which is sent down the logging cable on command from the surface of the earth. Series resonant LC filters are employed to take the signal from the cable. As indicated the signal from the filters L1–C1 and L2–C2 are fed through emitter follower amplifiers comprising the transistors QA and QE respectively. The output from the emitter follower transistors QA and QE is then fed to the differential amplifiers which, as shown in the drawing, are comprised of the transistors QB–QC and QF–QG, respectively. The differential amplifier configurations are used because of their very stable temperature characteristics.

The differential amplifiers convert the A.C. control signal to a D.C. voltage which is linearly related to the amplitude of the A.C. control signal. The rise time of the D.C. voltage after the control signal is switched on is about 50 milliseconds. Such a long time constant insures that spurious signals will not activate the motor M.

When the D.C. level at the output of QD reaches a level of about 7 volts (a signal of 400 Hz. has been applied to L1–C1) transistors Q1, Q2, and Q3 in the motor drive circuitry will conduct current and apply approximately 40 volts to the D.C. motor. If an 800 Hz. signal is applied to the system the filter comprised of C2–L2 will cause QE, QF, QG and QH to act upon Q4 thus turning on Q4, Q5, and Q6. The polarity of the voltage applied to the motor will be reversed thereby reversing the direction of rotation of the motor M. Should both frequencies be applied simultaneously Q2 and Q5 will cut off forcing Q3 and Q6 to cut off. Therefore no current can flow through the series Q2, Q5 and Q4 or Q1, Q2 and Q6, or Q6, Q5 and Q4, or Q1, Q2 and Q3.

In addition, the motor drive circuitry comprising the transistors Q1–Q6 and the other elements shown in the drawing figure has a safety feature which is designed to protect these driving transistors. In prior art motor drive designs the danger existed that if both sides of the drive circuit were turned on simultaneously a D.C. path was provided from the high voltage terminal to ground. This would easily destroy the drive transistors. However, in the circuit shown in the drawing figure if both sides are accidentally turned on the transistors Q2 and Q5 would turn off thereby forcing both sides of the motor to a level of 40 volts. Since Q6 and Q3 are also cut off the motor will take a level depending on the leakages of transistors Q6. Q3, Q2 and Q5. There will be very little current flowing and the circuit will be well protected. Thus, there is no low impedance path from the high voltage source to ground and the transistors are thereby protected.

The inductance coil L3 is, as shown in the drawing figure, arranged in series with the motor M in order to reduce the effects at the LC resonant filters of the large voltage variations present at the terminals of motor when the motor is in operation.

As shown, the motor is mechanically coupled to a 2000 ohm potentiometer. The potentiometer P is electrically connected to the output of the preamplifier. The motor M controls the position of the wiper arm on the potentiometer which wiper arm in turn controls the gain of the preamplifier.

While there has been shown and described one more or less specific embodiment of the invention it is to be understood that this has been done for purposes of illustrations only and that the scope of the invention is not to be limited thereby but is to be determined from the appended claims.

What is claimed is:

1. Control circuitry comprising: a pair of band pass filters, each having input and output terminal means; a pair of emitter follower amplifiers, each having input and output terminal means, each said emitter follower amplifier having the input terminal means thereof coupled to the output terminal means of a different one of the band pass filters; a pair of differential amplifiers, each having input and output terminal means, each said differential amplifier having the input terminal means thereof coupled to the output terminal means of a different one of said emitter follower amplifiers; motor control circuit means having input terminal means and output terminal means, the input terminal means of said motor control circuit means being coupled to the output terminal means of all said differential amplifiers; a drive motor coupled to the output terminal means of said motor control circuit means; and, a potentiometer having a wiper arm mechanically coupled to said drive motor for movement thereby.

2. The control circuitry according to claim 1 wherein said motor is a D.C. motor which is rotatable in either clockwise or counterclockwise directions responsive to said motor control circuit means.

3. The control circuitry according to claim 1 wherein said motor is a D.C. motor having a pair of input terminal means and said motor control circuit means is comprised of a first PNP transistor having an emitter, collector and base, said emitter of said first PNP transistor being coupled to said input terminal means of said band pass filters; a second PNP transistor having an emitter, collector and base, said emitters of said first and second PNP transistors being commonly coupled together; first, second, third and fourth NPN transistors, each having an emitter, collector and base, said collectors of said first and second NPN transistors being coupled to the collectors of said first and second PNP transistors, respectively; first and second diodes coupled in series between the emitters and collectors of said first and third NPN transistors and said second and fourth NPN transistors respectively, the emitters of said third and fourth transistors being commonly coupled, first impedance means coupling the bases of said third and fourth transistors to the output terminal means of a different one of said differential amplifiers; second impedance means coupling the base of the first NPN transistor to both the collector of the fourth transistor and the emitter of the first PNP transistor; third impedance means coupling the base of the second NPN transistor to both the collector of the third transistor and the emitter of the first PNP transistor; fourth impedance means coupling the bases of the two PNP transistors to their own emitters and to a different one of the motor's input terminal means; and means coupling a different one of the motor's input terminal means to the respective collectors of said first and second NPN transistors.

4. The control circuit according to claim 3 further comprising an inductance in series between the emitter of said first PNP transistor and the input terminal means of said band pass filters.

5. The control circuit according to claim 1 further comprising a detector-photomultiplier, and an amplifier coupled to the output of the former and said potentiometer being coupled to the output of said amplifier.

References Cited

UNITED STATES PATENTS

| | | | |
|---|---|---|---|
| 3,022,420 | 2/1962 | Brinkerhoff | 318—20.350 |
| 3,202,967 | 8/1965 | Wolff | 318—16 |
| 3,233,161 | 2/1966 | Sikorra | 318—294 |

B. DOBECK, Primary Examiner

T. L. CROSSON, Assistant Examiner

U.S. Cl. X.R.

318—28, 257, 294